US009277636B2

(12) United States Patent
Voronin et al.

(10) Patent No.: US 9,277,636 B2
(45) Date of Patent: Mar. 1, 2016

(54) PLASMA TORCH

(75) Inventors: Sergey Alexandrovich Voronin, Rensselaer, NY (US); Christopher James Philip Clements, Burnham on Sea (GB); Daniel Martin McGrath, Bristol (GB); Fraser Gray, Clevedon (GB); Andrew James Seeley, Bristol (GB)

(73) Assignee: Edwards Limited, Crawley, West Sussex (GB)

( * ) Notice: Subject to any disclaimer, the term of this patent is extended or adjusted under 35 U.S.C. 154(b) by 0 days.

(21) Appl. No.: 14/009,451

(22) PCT Filed: Apr. 12, 2012

(86) PCT No.: PCT/GB2012/050803

§ 371 (c)(1), (2), (4) Date: Oct. 2, 2013

(87) PCT Pub. No.: WO2012/140425

PCT Pub. Date: Oct. 18, 2012

(65) Prior Publication Data

US 2014/0027411 A1 Jan. 30, 2014

(30) Foreign Application Priority Data

Apr. 14, 2011 (GB) .................................. 1106314.6
Mar. 29, 2012 (GB) .................................. 1205602.4

(51) Int. Cl.
*B23K 10/00* (2006.01)
*H05H 1/34* (2006.01)

(52) U.S. Cl.
CPC ......... *H05H 1/34* (2013.01); *H05H 2001/3426* (2013.01); *H05H 2001/3468* (2013.01); *H05H 2001/3484* (2013.01)

(58) Field of Classification Search
CPC .............. H05H 2001/3426; H05H 2001/3468; H05H 2001/3484; H05H 2001/3457; H05H 1/34; H05H 1/26
USPC ............... 219/121.5, 121.51, 121.52, 121.48, 219/121.39, 75
See application file for complete search history.

(56) References Cited

U.S. PATENT DOCUMENTS 4,587,397 A 5/1986 Camacho et al.
4,656,330 A 4/1987 Poole
(Continued)

FOREIGN PATENT DOCUMENTS

CN 1404925 A 3/2003
CN 201783749 U 4/2011
(Continued)

OTHER PUBLICATIONS

Communication and European Search Report dated Feb. 3, 2015 for corresponding European Patent Application No. 14181115.8.
(Continued)

*Primary Examiner* — Mark Paschall
(74) *Attorney, Agent, or Firm* — Westman, Champlin & Koehler, P.A.

(57) ABSTRACT

To lengthen the service period on DC plasma abatement devices a modified DC plasma torch is provided with an electrically conductive cathode and an electrically conductive anode spaced apart from one another to form a gap therebetween; a metal swirl bush at least partially located within the gap and comprising a channel adapted to permit, in use, a gas to flow through the gap; and a ceramic element interposed between any one or more of: the cathode and the swirl bush; and the anode and the swirl bush.

19 Claims, 2 Drawing Sheets

(56) References Cited

U.S. PATENT DOCUMENTS

| | | | | |
|---|---|---|---|---|
| 5,216,221 | A | 6/1993 | Carkhuff | |
| 5,235,155 | A | 8/1993 | Yamada et al. | |
| 5,444,209 | A | 8/1995 | Crawmer et al. | |
| 5,591,356 | A | 1/1997 | Sakuragi et al. | |
| 5,599,469 | A * | 2/1997 | Yoshino | 219/121.55 |
| 5,994,663 | A | 11/1999 | Lu | |
| 6,084,199 | A * | 7/2000 | Lindsay et al. | 219/121.52 |
| 6,096,992 | A | 8/2000 | Severance, Jr. | |
| 6,163,008 | A | 12/2000 | Roberts et al. | |
| 2002/0179578 | A1 * | 12/2002 | McBennett | 219/121.52 |
| 2005/0258150 | A1 | 11/2005 | Hewett et al. | |
| 2007/0262060 | A1 | 11/2007 | Roberts et al. | |
| 2008/0093346 | A1 | 4/2008 | Yamaguchi et al. | |
| 2012/0031881 | A1 * | 2/2012 | Griffin | 219/121.5 |

FOREIGN PATENT DOCUMENTS

| | | | |
|---|---|---|---|
| DE | 4305541 | A1 | 8/1994 |
| EP | 0342388 | A2 | 11/1989 |
| EP | 0515975 | A2 | 12/1992 |
| EP | 0748149 | A1 | 12/1996 |
| EP | 1061782 | A2 | 12/2000 |
| WO | 9111089 | A1 | 7/1991 |
| WO | 2006013355 | A1 | 2/2006 |

OTHER PUBLICATIONS

Communication dated Feb. 2, 2015 for corresponding European Patent Application No. 12719031.2.

International Search Report dated Jul. 5, 2012 for corresponding PCT Application No. PCT/GB2012/050803, filed Apr. 12, 2012.

International Written Opinion dated Jul. 5, 2013 for corresponding PCT Application No. PCT/GB2012/050803, filed Apr. 12, 2012.

United Kingdom Search Report dated Aug. 12, 2011 of Application No. GB1106314.6, filed Apr. 14, 2011.

United Kingdom Search Report dated Aug. 2, 2012 of Application No. GB1205602.4, filed Mar. 29, 2012.

First Office Action dated Apr. 24, 2015 and Chinese Search Report dated Apr. 19, 2015 for corresponding Chinese Application No. 201280018400.4.

* cited by examiner

PLASMA TORCH

CROSS-REFERENCE TO RELATED APPLICATION

This application is a Section 371 National Stage Application of International Application No. PCT/GB2012/050803, filed Apr. 12, 2012, which is incorporated by reference in its entirety and published as WO 2012/140425 A1 on Oct. 18, 2012 and which claims priority to British Application Nos. 1106314.6, filed Apr. 14, 2011 and 1205602.4, filed Mar. 29, 2012.

BACKGROUND

The present disclosure relates to a plasma torch. The invention finds particular use in the abatement of exhaust gases from processes, such as those from the semiconductor industry.

Preventing or limiting the emission of hazardous gases exhausted from industrial processes to the atmosphere is now a major focus of both the scientific and industrial sectors. In particular the semiconductor industry, where the use of process gases is inherently inefficient, has set its own targets for reducing the amount of gases exhausted to the atmosphere from fabrication plants. Examples of compounds which it is desirable to destroy are those from etch processes such as fluorine, $SF_6$, $NF_3$ or perfluorocarbons ($CF_4$, $C_2F_6$ etc.)

One method of destroying, or abating, unwanted gases from an exhaust gas stream uses a plasma abatement device. Plasmas are particularly useful when the fuel gases normally used for abatement by combustion are not readily available; for example, as described in EP1773474.

Plasmas for abatement devices can be formed in a variety of ways. Microwave plasma abatement systems can be connected to the exhaust of several process chambers. However, each device requires its own microwave generator which can add considerable cost to a system. DC plasma torch abatement devices are advantageous over microwave plasma devices in that a plurality of torches may be operated from a single power DC power supply.

An example of a known DC plasma torch is shown schematically, in cross-section, in FIG. 1. The torch 10 comprises a generally cylindrical cathode 12 partially nested within an upstream opening of a generally tubular anode 14. An annular space 16 is provided between the cathode 12 and anode 14, through which a plasma source gas such as argon or nitrogen (not shown) can flow.

The cathode 12, and optionally the anode 14, is electrically connected to a power supply (not shown), which can be configured to apply a DC voltage between the cathode 12 and anode 14, or an AC voltage to either or both of the cathode 12 and anode 14. The magnitude and frequency of the voltage required is generally determined and selected by reference other process parameters, such as the exhaust gas or plasma source gas species and flow rate, the cathode-anode spacing, gas temperature etc. In any event, an appropriate voltage regime is one that causes the gas to ionise and thereby form a plasma.

In the illustrated prior art example of FIG. 1, it will be noted that the interior geometry of the tubular anode 14 comprises (going from the upstream end (shown uppermost in the drawing) to the downstream end (shown lowermost in the drawing)) a first inwardly-tapering frusto-conical portion 18 leading to a substantially parallel-sided throat portion 20, which leads to an outwardly-tapering frusto-conical portion 22. The effect of this geometry is to accelerate and compress incoming gas to create a small region 24 of relative high speed, relatively compressed gas in a region immediately downstream of the cathode 12, The cathode 12 comprises a generally cylindrical body portion 26 leading to a chamfered free end portion 28 whose external geometry substantially matches the internal geometry of the inwardly-tapering frusto-conical portion 18 of the anode 14. The body portion 26 of the cathode 12 is manufactured from a high-conductivity metal, such as copper, which is usually water-cooled. At the centre of the generally planar lower face 30 of the cathode 12, there is provided an axially-projecting button-type cathode 32, which provides a preferential electrical discharge site. This is accomplished by selecting a different material for the button 32 than the main body 28 of the cathode arrangement, i.e. such that the cathode body 28 is formed of a conducting metal with a higher thermal conductivity and work function than that of the thermionic material of the button cathode 32. For example it is common to use a copper cathode body 28 and a hafnium button 32. The anode 14 can be formed of a similar material to the main body portion 28 of the cathode 12, e.g. copper It will be noted that the button cathode 32 is positioned in the region of relative high speed, relatively compressed gas 24. The effect of such an arrangement is to create a region of preferential electrical discharge for the plasma source gas, when in a relatively compressed, high-speed, state; i.e. suitable for the formation of a plasma 34. The plasma 34 is thus nucleated in the region immediately below the cathode 12 and exits as a jet via the throat 20 and expands and decelerates thereafter in the outwardly-tapering frusto-conical portion 22 of the anode 14.

In operation of the plasma torch of FIG. 1, the plasma source, or feed, gas (i.e. a moderately inert ionisable gas such as nitrogen, oxygen, air or argon) is conveyed to the annular space 16 via an inlet manifold (not shown). To initiate, or start the plasma torch, a pilot arc must first be generated between the thermionic button cathode and the anode. This is achieved by a high frequency, high voltage signal, which may be provided by a generator associated with the power supply for the torch 10 (not shown). The difference in thermal conductivity between the copper body 26 and the hafnium button 32 of the cathode arrangement means that the cathode temperature will be higher and the electrons are preferentially emitted from the button 32. Therefore when the aforementioned signal is provided between the electrodes 12 and 14 a spark discharge is induced in the plasma source gas flowing into the plasma forming region 24. The spark forms a current path between the anode 14 and cathode 12; the plasma is then maintained by a controlled direct current between the anode 14 and the cathode 12. The plasma source gas passing through the exit throat 20 produces a high momentum plasma flare of ionised source gas.

In most cases, the plasma flare will be unstable and cause anode erosion, it therefore need to be stabilised by generating a spiral flow, or vortex, of the inlet plasma gas between the electrodes 12, 14.

One method of creating the vortex, or gas swirl, is by the use of a cathode arrangement which comprises a swirl bush element. An example of this type of known arrangement is shown in FIG. 2. For simplicity in identical features appearing in FIGS. 1 and 2 have been given the identical reference signs and will not be described again.

The cathode arrangement 12 as shown in FIG. 2 is substantially the same as that shown in FIG. 1, except that it additionally comprises an annular swirl bush 40. The swirl bush 40 is formed from a generally tubular element interposed between the cathode 12 and anode 14. Although not discernable from the drawings, the swirl bush 40 comprises a plurality of non-linear (e.g. part-helical) grooves or vanes that form non-axial flow channels for sub-streams of the gas.

The outer surface of the swirl bush 40 is formed to cooperate with a portion of the inwardly-tapering frusto-conical surface portion of the anode arrangement 14. The outer surface of the swirl bush 40 substantially matches the internal wall angle of the cooperating portion of the frusto-conical anode 12 and further comprises angular grooves in its surface which form conduits for guiding the flow of plasma source gas. The angular grooves may also, or instead, be formed in the surface of the cooperating portion of the frusto-conical anode 18.

The effect of the vanes or grooves is to cause discrete sub-streams of the gas to flow along spiralling trajectories thereby creating a vortex in the region of relative high speed, relatively compressed gas 24 where the individual sub-streams of gas converge. The rotational component of the gas' momentum as it exits via the throat 20 of the torch 10 causes the plasma jet 34 to self-stabilise.

In order for the torch 10 to function, the cathode 12 and anode 14 must be electrically isolated from one another. As such, any element interposed between, and in contact with both, the cathode 12 and anode 14 must be electrically insulating. In this case, the swirl bush 40 is manufactured of a dielectric material, 1 such as PTFE, which functions as an electrical insulator between the two electrodes 12, 14 and is also somewhat resistant to chemical attack by the high reactive plasma ions, such as atomic fluorine produced during the abatement of perfluorocarbons if they are passed through this region.

The discussion above is merely provided for general background information and is not intended to be used as an aid in determining the scope of the claimed subject matter. The claimed subject matter is not limited to implementations that solve any or all disadvantages noted in the background.

SUMMARY

The components of the aforementioned plasma abatement devices 10 are required to continuously operate for many hours. However, it has been found that swirl bushes formed of PTFE are quickly degraded by high temperature conditions within the plasma torch 10. Therefore, they frequently have to be replaced to ensure the reliability of the device and prevent subsequent damage to other components of the torch, such as the anode. It is possible to limit the effects of heat by cooling the cathode arrangement, but this adds to the running cost of the device.

As metal is generally resistant to the high temperature conditions of the type of plasma formed in a DC plasma device, it may be considered that the swirl bush could be made from metal to prolong its working life. However, because it is also an electrical conductor a metal swirl bush must therefore be electrically insulated from the anode to prevent current being drawn between the anode and the swirl bush. As discussed above, due to its short operating life at high temperatures it is not possible to use PTFE to insulate the swirl bush from the anode.

Air is also a good insulator and so a metal swirl bush may be simply spaced from the anode. However, using an air gap reduces the ability of the swirl bush to generate a vortex, because a portion of the plasma source gas will pass into the plasma forming region without being conveyed along the conduits of the swirl bush. In addition the arc would likely start from the metal swirl bush destroying it over time. In particular, a metal swirl bush must be very accurately and uniformly spaced from the anode to prevent arcing occurring preferentially at the portions of the swirl bush which are closer to the anode (rather than at the button cathode).

Objects of the innovations include but are not limited to: providing an alternative DC plasma torch; providing an improved DC plasma torch; and/or addressing one or more of the problems outlines above According to a first aspect, there is provided A DC plasma torch comprising: an electrically conductive cathode and an electrically conductive anode spaced apart from one another to form a gap therebetween; a metallic swirl bush at least partially located within the gap and comprising a channel adapted to permit, in use, a gas to flow through the gap; and a ceramic element interposed between any one or more of: the cathode and the swirl bush; and the anode and the swirl bush.

By using a metal swirl bush and by insulating the anode/cathode from the metal swirl bush it has been found that the operating lifetime of the components can be greatly extended compared to the aforementioned arrangement employing PTFE.

In a first preferred embodiment of the invention, the ceramic element comprises a ceramic coating of the swirl bush. The main advantages of a ceramic coating are that the number of parts can be reduced, i.e. a separate insulator is not necessarily required, and ease of manufacture, because ceramic coatings are relatively easy to apply.

Most preferably, the ceramic element is formed of an electrically insulative (insulating) oxide, for example, by oxidation of the surface of the metal swirl bush.

The ceramic coating, where provided, may comprise an in-grown portion extending inwardly of the nominal surface of the metal to improve adhesion of the oxide to the underlying metal. Additionally or alternatively, the ceramic coating may comprise an out-grown portion extending outwardly of the nominal surface of the metal. The ingrown and outgrown portions of the oxide may have different mechanical, chemical, or topological properties.

The ceramic coating may be formed via plasma electrolytic oxidation (PEO) of the metal of the metal swirl bush. Most preferably, the ceramic coating is formed via the Keronite process, which produces high-quality, hard, dense, durable, geometrically stable, wear-resistant and/or electrically-insulative oxide coatings.

In this process a swirl bush, formed of a metal or alloy, such as aluminium, is suspended in a bath of liquid electrolyte and subjected to an electrical current which cause sparks to form on the surface of the metal swirl bush. The sparks oxidize the surface of the metal forming a ceramic Keronite layer.

The process is self regulating with a uniform thickness Keronite layer being formed; even along complex surface formations such as the grooves of the swirl bush. The thickness of the layer is dependent on the processing time. Up to 4 microns per minute can be formed on the surface of a magnesium object.

Additionally, or alternatively, electrical isolation of the cathode and anode can be accomplished using a discrete ceramic insulating element interposed between the cathode and swirl bush and/or the anode and swirl bush.

Both these arrangements allows the cathode arrangement to be accurately and consistently located within the anode arrangement, because a metal swirl bush and ceramic electrical break are formed of relatively rigid materials. Thus, the two cooperating anode and cathode elements can rest tightly against each other. This prevents movement and removes the requirement to accurately (manually) set an air gap between the anode and cathode arrangements.

In addition, by forming the swirl bush from metal it is more resistant heat formed in the plasma and so significantly less cooling, if any, is needed to protect it.

One preferred ceramic material for the discrete ceramic element comprises fluorphlogopite mica in a borosilicate glass matrix.

The cathode preferably comprises a generally cylindrical body portion and the anode preferably comprises a generally tubular portion (or vice-versa). By at least partially nesting the cathode within the anode (or vice-versa) an annular gap can be formed between the cathode and anode for receiving the swirl bush.

The internal geometry of the generally tubular portion may comprise a first inwardly-tapering, frusto-conical portion to compress and/or accelerate incoming plasma source gas. The first inwardly-tapering, frusto-conical portion preferably leads to a second substantially parallel-sided throat portion to form a region, in use, of relatively high gas pressure within the gap and an exit aperture for the plasma.

Where a discrete ceramic insert is used, the first inwardly-tapering, frusto-conical portion may comprise a generally parallel-sided recess for receiving the discrete ceramic insert. In such a situation, the discrete ceramic insert preferably comprises an annular ring having an outer surface substantially corresponding in shape and dimensions of the parallel-sided recess and a tapered inner surface substantially corresponding to the outer surface of the swirl bush.

The substantially parallel-sided throat portion may lead to a third, outwardly-tapering, frusto-conical portion to provide an expansion/deceleration zone downstream of the plasma torch.

The generally cylindrical body portion of the cathode preferably comprises a button-type electrode formed of a material having a lower thermal conductivity and work function than that of the generally cylindrical body portion. The button electrode, where provided, may be formed of a thermionic material, such as hafnium and the generally cylindrical body portion may be manufactured of copper.

At least one channel of the swirl bush may be adapted to impart a rotational (helical) component to the momentum of the plasma source gas flowing through the torch.

A second aspect of the invention provides a DC plasma torch arrangement comprising a cathode body, a button cathode, and a metal swirl bush; an anode arrangement comprising a throat and a convergent inner surface; wherein the swirl bush cooperates with a portion of the inner convergent surface of the anode to generate a vortex when a plasma source gas is passed between the cathode and anode arrangement; and wherein the cooperating portion of the inner surface of the anode is formed from a ceramic electrical break.

Other preferred and/or optional aspects of the invention are defined in the accompanying claims.

This Summary is provided to introduce a selection of concepts in a simplified form that are further described in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order that the present invention may be well understood, embodiments thereof, which are given by way of example only, will now be described with reference to the accompanying drawings, in which:

FIGS. 3 and 4 share some common elements with FIGS. 1 and 2 described previously. Identical features have therefore been identified by identical reference signs and the description of each identical feature has not been repeated below.

DETAILED DESCRIPTION

Figure 1:
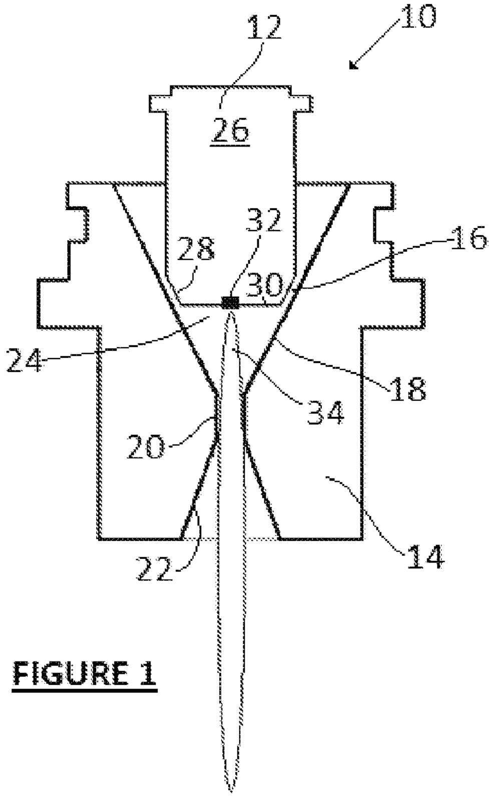
FIG. 1 is a schematic longitudinal section through a first known DC plasma torch.
Figure 2:
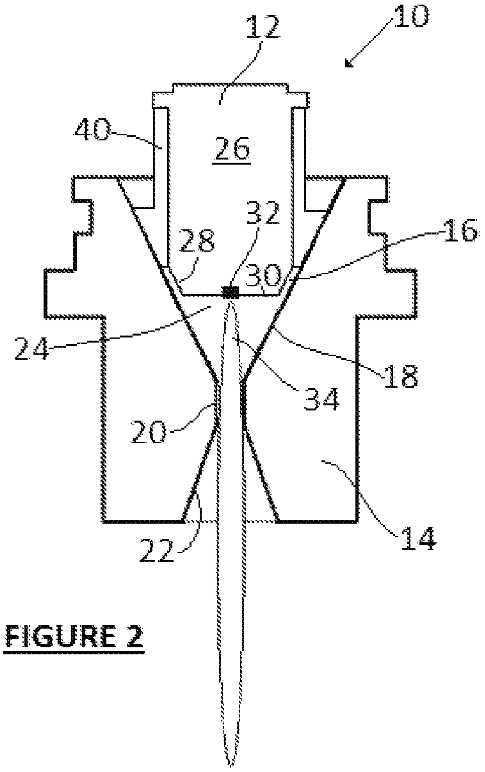
FIG. 2 is a schematic longitudinal section through a second known DC plasma torch.
Figure 3:
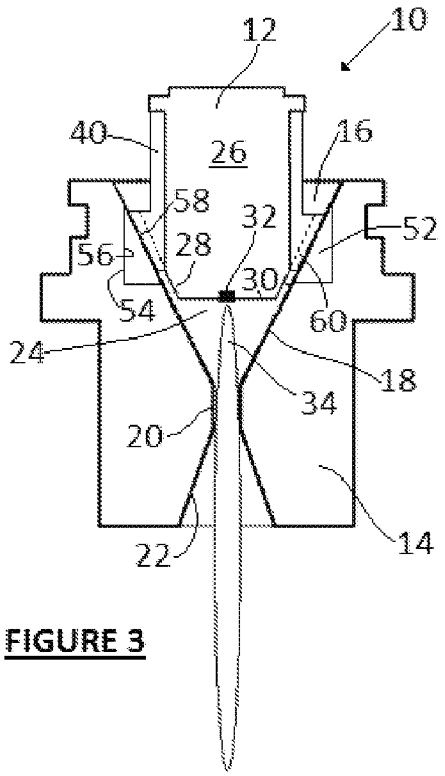
FIG. 3 is a schematic longitudinal section through a DC plasma torch according to the second aspect of the invention.

In FIG. 3, the DC plasma torch 10 comprises a cathode arrangement 12 and an anode arrangement 14 as previously described in relation to the known torches of FIGS. 1 and 2. The main differences between the invention as shown in FIG. 3 and the prior art torches shown in FIGS. 1 and 2 is the fact that the swirl bush 40 is manufactured of metal. To insulate the swirl bush 40 from the adjacent cathode 12 and anode 14, an annular ceramic insert (ceramic electrical break) 50 has been provided. The swirl bush element 40 is formed of an electrically conductive metal, or alloy, which can survive temperatures greater than 200° C., such as copper, stainless steel or tungsten. The swirl bush may be a separate element which is tightly engaged to and in electrical contact with the cathode 12 body 26. Alternatively it may be integral and formed from the same material as the cathode 12 body 26. If the swirl bush is formed from a separate element (as shown in this example) it can be retro fitted to existing DC plasma abatement systems, such as that illustrated in FIG. 2. The anode arrangement 14 comprises a tubular body portion, usually formed of copper, which further comprises a throat portion 20; an inner frustro-conical surface portion 18 convergent towards, and terminating at, the throat 20; and a ceramic electrical break element 52. The taper of the convergent surface is designed to stabilise the plasma source gas stream and direct the plasma flare towards the throat 24.

The ceramic electrical break element 52 is formed from commercially available, inexpensive and easily machineable ceramics, such as a fluorphlogopite mica in a borosilicate glass matrix (also know as MACOR® made by Corning International) which is highly resistant to heat and is electrically insulating.

When assembled, the cathode arrangement 12 is located within and concentric to the copper anode 14. The anode 14 and cathode 12 are spaced from each other to provide a conduit 16 therebetween.

Ceramics are useful materials but it is difficult and expensive material to form into complex shapes due to their fragility. Whilst it may be considered a good material from which to make the swirl bush the cost of doing so is typically prohibitively expensive. Accordingly, a ceramic material is used but is formed into a relatively simple shape. In this example, ceramic material is formed into an annular ring which can be readily formed from known techniques. The anode 14 is formed with an annular recess 54—in this case, in the form of a partial, axial blind hole, for receiving the ceramic electrical break element 52.

The ceramic electrical break element 52 has a radially outermost surface profile 56 that matches that of the annular recess 54 and a radially innermost surface 58 that is a continuation of, and which sits flush with the inner tapering surface 18 of the metal anode 14. The electrical break element 52 is located for cooperation with the swirl bush 40 for forming a stabilising plasma source gas vortex and, as shown, the metal swirl bush 40 is in contact with the ceramic electrical break element 52. The ceramic electrical break element 52 may extend on each axial side of the swirl bush as shown in FIG. 3 or at least on the downstream axial side thereof to ensure that arcing does not occur between the metal swirl bush 40 and the metal anode 14.

As indicated, the swirl bush 40 is made from metal and therefore can be readily manufactured, and is resistant to and high temperatures. However, the present arrangement allows the swirl bush element 40 of the cathode arrangement to be located in contact with the inner tapering surface 18 of the anode arrangement 14 and to form spiral conduits (not shown) in the grooves formed in the outer surface of the swirl bush 40. The grooves 60 are indicated schematically by dotted lines in FIG. 3. Accordingly, the spiral grooves are formed partly by the ceramic electrical break element 56. In the context, the spiral configuration of the grooves 60 covers any suitable surface configuration by which a vortex may be formed in the plasma forming region 24.

In operation of the plasma torch of FIG. 3, a plasma source gas is passed through conduit 16 from a supply of gas (not shown). To initiate, or start, the plasma torch a pilot arc must first be generated between the thermionic button cathode 32 and the anode 14. This is achieved by a high frequency, high voltage signal, which may be provided by the generator associated with the power supply for the torch (not shown). The difference in thermal conductivity and work function between the copper body 26 and the hafnium button-type cathode 32 means that thermionic electrons are preferentially emitted from the button-type cathode 32. Therefore when the aforementioned signal is provided between the electrodes 12, 14 a spark discharge is induced in the plasma source gas flowing into the plasma forming region 24. The spark forms a current path between the anode 12 and cathode 14; the plasma is then maintained by a controlled direct current between the anode 12 and the cathode 14. The plasma source gas passing through the torch 10 produces a high momentum plasma flare 34 of ionised source gas which exits the torch 10 via the throat 20 and divergent nozzle 22. The vortex formed in the plasma forming region 24 stabilises the plasma plume 34 and reduces erosion of the anode 14.

Figure 4:
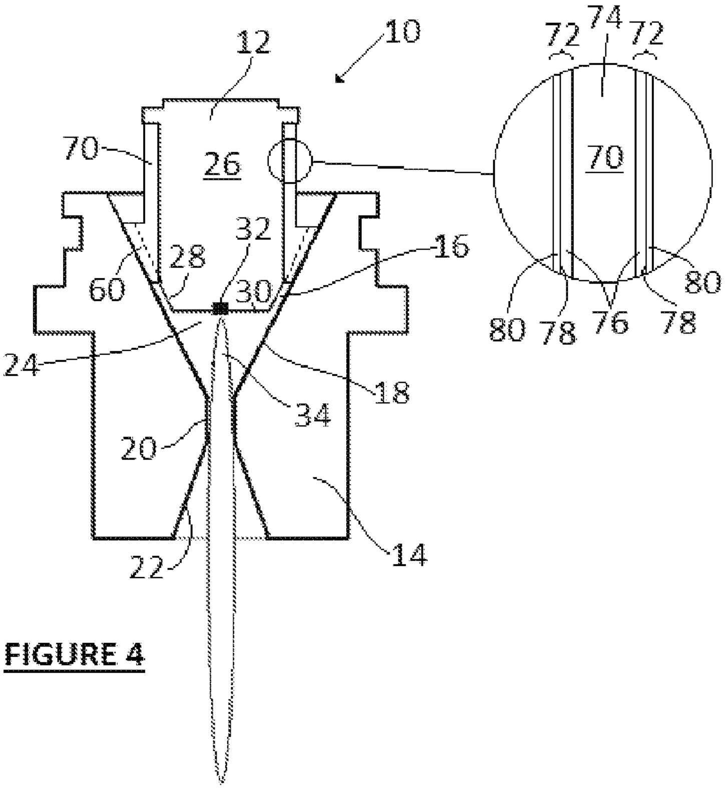
FIG. 4 is a schematic longitudinal section through a DC plasma torch according to the first aspect of the invention.

Referring now to FIG. 4, the torch 10 is similar in construction to that shown in the known example of FIG. 2 except that in this case, the swirl bush 70 is manufactured of a metal, rather than a ceramic material. As can be seen from the inset (not to scale) of FIG. 4, the swirl bush 70 comprises a ceramic surface coating 72 formed by a plasma oxidation process, preferably the Keronite process, overlying the bulk metal 74 underneath. The Keronite process works well with metals such as aluminium and its alloys. It will be apparent to those skilled in the art that the original swirl bush material subjected to the Keronite process must be suitable to both be subjected to the Keronite process and, in the apparatuses where the cathode and swirl bush are integral, suitable material to act as a cathode. The Keronite process causes the oxide film to grow inwardly as well as outwardly, thereby forming an ingrown layer portion 76 located inwardly of the nominal metal surface 78 and an outgrown layer portion 80 located outwardly of the nominal metal surface. The ingrown 76 and outgrown 80 layers usually have different mechanical, chemical and electrical properties, although at least one of the layers will be a good dielectric thereby providing the requisite electrical insulation between the swirl bush 70 and either, or both of, the cathode and anode.

In a third aspect the present invention provides a swirl bush comprising a ceramic layer.

The invention is not restricted to details of the foregoing embodiments, for example, the shape and configuration of the various elements could be changed as could the materials of construction. Moreover, the terms cathode and anode used herein could, in certain circumstances, be reversed without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A DC plasma torch comprising:

an electrically conductive cathode and an electrically conductive anode spaced apart from one another to form a gap therebetween;

a metal swirl bush at least partially located within the gap; and a ceramic element positioned such that the ceramic element defines a portion of a channel and one of the anode, the cathode and the metal swirl brush defines another portion of the channel, wherein the portion of the channel defined by the ceramic element and the portion of the channel defined by one of the anode, the cathode and the metal swirl brush together impart a rotational component to a momentum of a gas as the gas flows through the channel.

2. The DC plasma torch as claimed in claim 1, wherein the ceramic element comprises a ceramic coating of the swirl bush.

3. The DC plasma torch as claimed in claim 2, wherein the ceramic coating comprises an electrically insulating oxide.

4. The DC plasma torch as claimed in claim 3, wherein the oxide is formed by oxidation of the surface of the underlying metal of the metal swirl bush.

5. The DC plasma torch as claimed in claim 2, wherein the ceramic coating comprises an in-grown portion extending inwardly of a nominal surface of the metal swirl brush and an out-grown portion extending outwardly of the nominal surface of the metal swirl brush.

6. The DC plasma torch as claimed in claim 2, wherein the ceramic coating is formed via plasma electrolytic oxidation of the metal of the metal swirl bush.

7. The DC plasma torch as claimed in claim 6, wherein the ceramic coating is formed via a Keronite process.

8. The DC plasma torch as claimed in claim 1, wherein the ceramic element comprises a discrete ceramic element.

9. The DC plasma torch as claimed in claim 8, wherein the discrete ceramic element comprises a fluorphlogopite mica in a borosilicate glass matrix.

10. The DC plasma torch as claimed in claim 1, wherein a first one of the cathode and anode comprises a generally cylindrical body portion and the second one of the cathode and anode comprises a generally tubular portion, wherein the first one of the cathode and anode is at least partially nested within, and spaced apart from, the second one of the cathode and anode.

11. The DC plasma torch as claimed in claim 10, wherein the internal geometry of the generally tubular portion comprises a first inwardly-tapering, frusto-conical portion leading to a second substantially parallel-sided throat portion.

12. The DC plasma torch as claimed in claim 11, wherein the ceramic element comprises a discrete ceramic element and wherein the first inwardly-tapering, frusto-conical portion comprises a generally parallel-sided recess for receiving the discrete ceramic insert.

13. The DC plasma torch as claimed in claim 12, wherein the discrete ceramic insert comprises an annular ring having an outer surface substantially corresponding in shape and dimensions to the parallel-sided recess and a tapered inner surface substantially corresponding to the outer surface of the swirl bush.

14. The DC plasma torch as claimed in claim 11, wherein the substantially parallel-sided throat portion leads to a third, outwardly-tapering, frusto-conical portion.

15. The DC plasma torch as claimed in claim 10, wherein the generally cylindrical body portion further comprises a button electrode.

16. The DC plasma torch as claimed in claim 15, wherein the generally cylindrical body portion is formed of a metal having a higher thermal conductivity and work function than that of the button electrode.

17. The DC plasma torch as claimed in claim 15, wherein the button electrode is formed of a thermionic material.

18. The DC plasma torch as claimed in claim 15, wherein the generally cylindrical body portion comprises copper and the button electrode comprises hafnium.

19. A metal swirl bush comprising a ceramic coating and defining a portion of a channel that imparts a rotational component to a gas as the gas passes through the channel, the metal swirl bush is at least partially located within a gap between an electrically conductive cathode and an electrically conductive anode such that another portion of the channel that imparts the rotational component to the gas is defined by one of the cathode and the anode.

* * * * *